United States Patent [19]
Williams et al.

[11] 4,057,031
[45] Nov. 8, 1977

[54] WINDOW PERCH FOR PET ANIMALS

[76] Inventors: Charles H. Williams; Charles E. Williams, both of 5958 N. 83rd St., Scottsdale, Ariz. 85252

[21] Appl. No.: 618,441

[22] Filed: Oct. 1, 1975

[51] Int. Cl.² .................................................. A01K 29/00
[52] U.S. Cl. .................................................................. 119/1
[58] Field of Search ................... 119/1; 248/208, 209, 248/236; 108/46, 47; 47/36

[56] References Cited

U.S. PATENT DOCUMENTS

| | | | |
|---|---|---|---|
| 1,224,127 | 5/1917 | Bartlett | 248/208 |
| 2,267,861 | 12/1941 | Haley | 108/47 UX |
| 3,857,365 | 12/1974 | Mueller | 119/1 |

*Primary Examiner*—Hugh R. Chamblee
*Attorney, Agent, or Firm*—Don J. Flickinger

[57] ABSTRACT

A platform is engaged along one edge thereof with a windowsill. The platform is maintained in a horizontal position by a support leg depending from the platform and abutting the wall below the window. A covering over the platform provides a cushiony rest for pet animals.

2 Claims, 4 Drawing Figures

U.S. Patent      Nov. 8, 1977      4,057,031
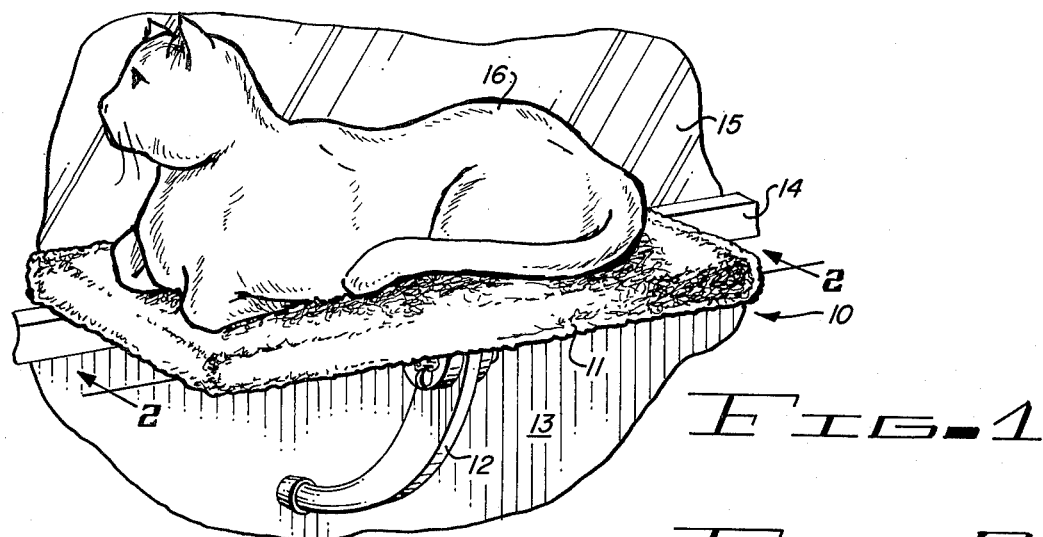
FIG-1
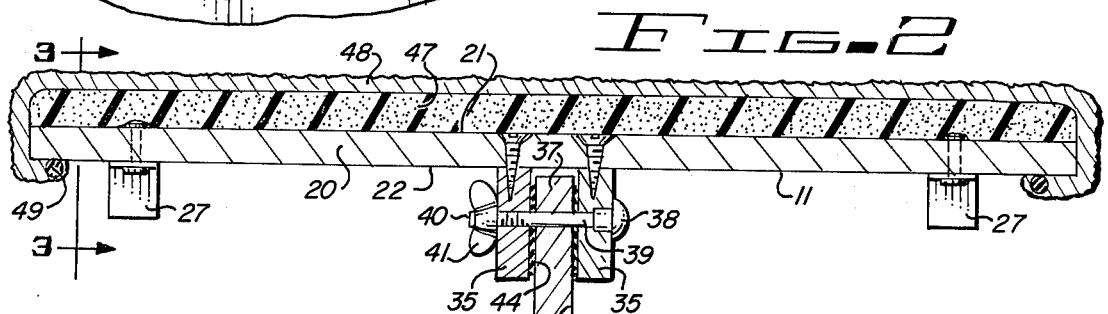
FIG-2
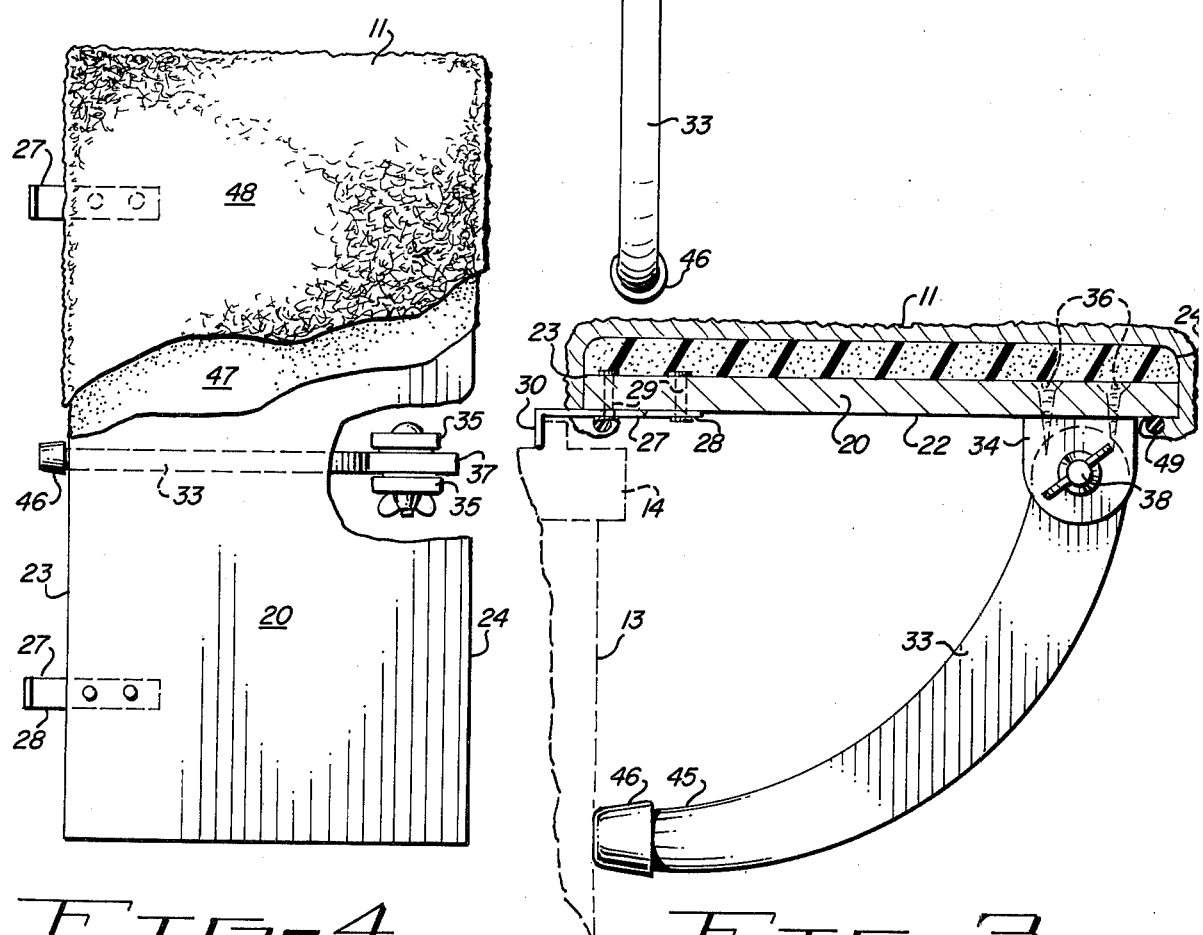
FIG-4
FIG-3

WINDOW PERCH FOR PET ANIMALS

This invention relates to bed or litter-type devices for small pet animals.

More particularly, the present invention concerns a pet animal perch which is detachably secureable to a windowed wall.

It is well known that pet animals are fascinated by gazing out of windows. Equally familiar is the phenomena of animals to be contented by napping or lounging in the warmth of the sun. In fact many animals can satisfyingly amuse themselves for extended periods in a warm resting place from which the environment can be viewed. Further, the psychological effect of an elevated perch is attractive to certain animals. It is observed, for example, that a cat will remain practically motionless for some time upon a windowsill. This is provided, of course, that the sill is of sufficient width and the owner does not object to scratch marks.

The prior art has provided numerous devices which, in common, are concerned with the comfort and convenience of pet animals. The devices include a vast array of housekeeping, grooming and amusement items. More pertinently, however, are the various beds and litters. In addition to conventional pet beds an assortment of special purpose litters are available. One type of litter is the pet carrying cage especially useful for travel by common carrier. Another common type is attachable to the back of an automobile seat and provides a vantage point for the pet during motor trips. Similar amenities for a pet animal while at home has not heretofore been recognized by the art.

It would be highly desirable, therefore, to further provide for the comfort and convenience of house pets.

Accordingly, it is principal object of the present invention to provide a device for use by house pets for napping in the sun or gazing from windows.

Another object of the present invention is the provision of an animal perch which is detachably secureable to a windowed wall.

Yet another object of the present invention is to provide an animal perch which is conveniently and easily attached to a windowed wall without tools or modification of the window or wall.

Still another object of the present invention is the provision of a device which has an attractive appearance and is readily color coordinated with the decor of the environment.

A further object of the instant invention is the provision of an animal perch having a readily renewable working surface for periodically eliminating wear and scratch marks.

And a further object of the invention is to provide a device of the above type which is durably constructed yet inexpensively manufactured.

Briefly, to achieve the desired objectives of the present invention provided is a rigid plate having a pair of spaced window engaging members extending from one edge thereof. A leg pivotally connected to the undersurface of the plate abuts the wall below the window and supports the plate in a substantially horizontal position. A cover is detachably engageable over the plate.

The foregoing and further and more specific objects and advantages of the present invention will become readily apparent to those skilled in the art from the following detailed description thereof taken in conjunction with the drawings in which:

FIG. 1 is a perspective view of an animal perch constructed in accordance with the teachings of the present invention as it would appear when erected for use and supporting an animal thereon;

FIG. 2 is a vertical sectional view taken along the line 2—2 of FIG. 1 and further illustrating the construction of the instant device;

FIG. 3 is a vertical sectional view taken along the line 3—3 of FIG. 2 and graphically depicting the manner of attachment of the animal perch to a windowed wall; and FIG. 4 is a plan view, partially broken away, further detailing the device of the instant invention.

Turning now to the drawings in which the same reference numerals indicate corresponding elements throughout the several views attention is first directed to FIG. 1 which shows a pet animal perch generally designated by the reference character 10 having a platform 11 and support means 12. A windowed wall is graphically represented in broken illustration by wall 13 and windowsill 14 at lower edge of glass windowpane 15. Perch 10 is used in combination with the windowed wall to provide a cushiony rest, we will be hereinafter described in greater detail, for a house pet specifically shown as cat 16 from which the animal can view the outside environment through window 15 or doze in the warmth of the sun rays entering through window 15.

Platform 11 as is further illustrated in FIGS. 2–4 has as a base rigid plate 20. In accordance with conventional manufacturing techniques rigid plate 20 is preferably fabricated from such material as plywood, composition board or aluminum. Rigid plate 20 includes top surface 21, under surface 22, inboard edge 23 and opposed outboard edge 24.

A pair of window engaging members 27 are spaced along inboard edge 23. Each window engaging member 27 includes a first section 28 in juxtaposition with undersurface 22 and extending beyond inboard edge 23. Rivets 29 extend through appropriate apertures in plate 20 and first section 28 for securing member 27 to platform 11. Window engaging member 27 terminates with a downwardly extending portion 30 which detachably engages windowsill 14 as is particularly noted in FIG. 3.

Support means 12 includes leg 33 and bracket 34. Bifurcated bracket 34 is provided by a pair of spaced ears depending from undersurface 22 proximate outboard edge 24. Screws 36 extend through plate 20 into ears 35 to secure support means 12 to platform 11.

Leg 33 has a flat sided upper end 37 which is received between ears 35. Carriage bolt 38 extends through bifurcated bracket 34 and upper end 37 of leg 33. Shank 39 and carriage bolt 38 provides a pin for pivotal movement of leg 33 relative bracket 34. Threaded section 40 of shank 39 extends beyond bracket 34 and is engaged with wing nut 41.

As wing nut 41 is tightened, as will be apparent to those skilled in the art, ears 35 are brought into clamping engagement with upper end 34 to positionally retain leg 33. A high frictional material 44 placed between leg 33 and bracket 34 increases the resistance to movement between leg 33 and bracket 34. High friction material 44 can be in the form of rubber washers or serrated face metallic or plastic washers. It has been found, however, that one of the mating surfaces either of upper end 33 or ear 35 can be coated with an elastomer such as rubber base paint during manufacture and at a subsequent time when perch device 10 is erected for use in the home will perform satisfactorily for the intended purpose. It is further noted that free end 45 of leg 33 is rounded and fitted with a friction-type resilient member such as crutch tip 46 to prevent leg 33 from moving upon or scratching wall 13.

A resilient sheet 47 such as foam rubber is placed over top surface 21 of rigid plate 20. Cover member 48 including elastic band 49 is placed over resilient sheet 47 and held in place by elastic band 47 on the undersurface 22 of rigid plate 20. Cover member 48 is appropriately fabricated from various types of conventional cloth. The purpose of each element of platform 11 will be readily appreciated. Rigid plate 20 provides a stable platform, resilient layer 47 provides for the comfort of the animal and cover 48 provides a material into which the claws of the animal can be embedded as the animal jumps upon the platform. Further cover 48 is quickly and conveniently removed and replaced as necessitated either by wear or desired to match environmental decor.

The device of the instant invention as is readily apparent from the foregoing detailed description thereof provides a stable horizontal platform from which a household pet can rest or amuse itself. Yet the device is readily detachably from the windowed wall of the home to be taken along on trips where it may be quickly and conveniently installed in hotel or motel rooms. During transportation the support leg is readily folded or alternately removed for compact stowage.

The instant invention has been hereinbefore described in detail in connection with particular use as a pet animal perch. However, it will be immediately apparent to those skilled in the art that other utility resides therein. For example, potted plants may be placed upon the shelf for permanent or temporary display or for an interim period to provide the plant with greater sunlight than is generally available throughout other areas of the dwelling. Similarly, objects d'art may be displayed for viewing by persons within the dwelling or those passing by the window. Curing and drying of various materials, especially hobby projects, can also be supported in the warmth of the sun by the shelf. In connection with the foregoing uses it is anticipated that various utility or decorative coverings may be used upon the platform.

Various changes and modifications in the device herein chosen for purposes of illustration will readily occur to those skilled in the art. For example, the bifurcated bracket can be replaced by a single tab bracket or other functional equivalent. Similarly, the position, location and number of window engaging means are readily alterable without infringing upon the intent of the device. Also, the platform may be variously contoured in accordance with individual preferences.

Having fully described and disclosed the present invention and the preferred embodiment thereof in such clear and concise terms as to enable those skilled in the art to understand and practice the same the invention claimed is:

1. A perch for use in combination with a wall having a window therein for providing a seating place for a small pet animal and for holding and displaying plants and other objects, said perch comprising:
   a. a substantially horizontal rigid plate have top and under surfaces and having an inboard edge adjacent said window and an outboard edge opposite said inboard edge;
   b. window engaging means extending from said inboard edge of said plate and including a downwardly extending portion detachably enagageable with the sill of said window;
   c. a bracket depending from the under surface of said plate proximate the outboard edge thereof;
   d. a leg pivotally connected at one end thereof to said bracket and extending from said one end arcuately downwardly inward therefrom to a free end for substantially perpendicular contact with said wall at a position spaced below said window;
   e. locking means for selectively positionally retaining said leg relative said bracket, said locking means comprising a high friction material grommet and means to selectively increase or decrease the axial compression on said grommet, whereby the leg is frictionally retained in a selected position, before further increase of said compression locks said leg in a selected position;
   f. a friction member having a high coefficient of friction in the form of a cup, the sides of said cup extending over said free end and thereby mounting said friction member on said free end, whereby the bottom of said cup abuts against said wall;
   g. whereby the thrust of said leg, through said friction member, perpendicularly against and downwardly along said wall, does not result in skidding of said friction member downwardly along said wall, with consequent collapse of said perch.

2. The perch of claim 1, wherein said locking means includes:
   a. a substantially horizontal pin extending through said bracket and through said leg for pivotal movement therebetween;
   b. a threaded section of said pin extending from said bracket;
   c. a nut engageable with said threaded section for clamping said bracket against said leg; and
   d. said grommet, composed of an elastomer, between said leg and said bracket for increasing the friction therebetween.

* * * * *